United States Patent [19]
Han

[11] Patent Number: 5,923,372
[45] Date of Patent: Jul. 13, 1999

[54] APPARATUS AND METHOD FOR CONTROLLING AN IRIS ACCORDING TO BRIGHTNESS VARIATION OF INPUT SIGNAL

[75] Inventor: Dong-ju Han, Kwangmyong, Rep. of Korea

[73] Assignee: Samsung Electronics Co., Ltd., Kyungki-Do, Rep. of Korea

[21] Appl. No.: 08/702,214

[22] Filed: Aug. 23, 1996

[30] Foreign Application Priority Data

Aug. 23, 1995 [KR] Rep. of Korea ................ 95-26202
Dec. 20, 1995 [KR] Rep. of Korea ................ 95-52937

[51] Int. Cl.$^6$ .................................................. H04N 5/238
[52] U.S. Cl. ................................. 348/363; 348/364
[58] Field of Search .................................. 348/207, 222, 348/229, 230, 231, 234, 362, 363, 364, 366; 250/208.1; H04N 5/238

[56] References Cited

U.S. PATENT DOCUMENTS

| | | |
|---|---|---|
| 4,780,766 | 10/1988 | Nutting . |
| 5,455,685 | 10/1995 | Mori ........................................ 348/363 |
| 5,473,374 | 12/1995 | Shimizu et al. ........................ 348/363 |

FOREIGN PATENT DOCUMENTS

| | | |
|---|---|---|
| 58-214133 | 12/1983 | Japan . |
| 61-182163 | 11/1986 | Japan . |
| 62-288818 | 12/1987 | Japan . |
| 63-204237 | 8/1988 | Japan . |
| 3127035 | 5/1991 | Japan . |
| 5127218 | 5/1993 | Japan . |
| 2251352 | 7/1992 | United Kingdom ........... H04N 5/235 |

OTHER PUBLICATIONS

Patent Abstracts of Japan, vol. 095, No. 002, Mar. 31, 1995, JP 06 311422 A, Nov. 4, 1994.

*Primary Examiner*—Tuan V. Ho
*Attorney, Agent, or Firm*—Sughrue, Mion, Zinn, Macpeak & Seas, PLLC

[57] ABSTRACT

An apparatus and a method for controlling an iris. The apparatus includes a data detector, a controller, and an iris controller using a feedback method, and further includes a buffer which stores an amplification ratio for modifying the input video signal to include a proper brightness level when the controller determines that adjustment of the iris is needed. An amplification ratio of 1 is stored when the controller determines that adjustment of the iris is not needed. A multiplier amplifies the input video signal by the amplification ratio stored in the buffer. As a result, a video signal having a proper brightness level is output.

9 Claims, 9 Drawing Sheets

APPARATUS AND METHOD FOR CONTROLLING AN IRIS ACCORDING TO BRIGHTNESS VARIATION OF INPUT SIGNAL

BACKGROUND OF THE INVENTION

1. Field of the Invention

The present invention relates to an apparatus and a method for controlling an iris in a video camera. More particularly, the present invention relates to an apparatus and a method for controlling an iris according to a brightness variation of an input signal to generate a video signal having a proper brightness level.

An apparatus for controlling an iris, which controls the aperture size of the iris according to the brightness variation of the input video signal in order to process a video signal having a proper brightness level, is indispensable to a video camera.

2. Description of the Prior Art

A conventional apparatus for controlling the iris of a camera uses a feedback method, and controls the aperture size of the iris when the brightness level of the input video signal changes, thereby achieving a video signal having a proper brightness level. The conventional apparatus for controlling the iris of a camera is shown in FIG. 1.

Figure 1:
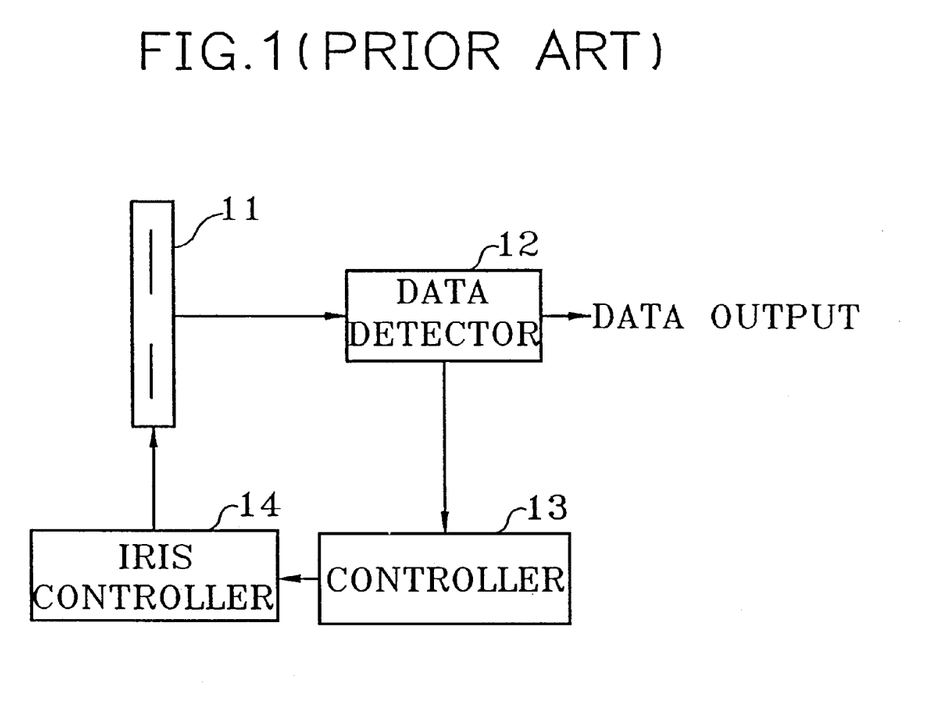
FIG. 1 is a block diagram of a conventional apparatus for controlling an iris.
Figure 2:
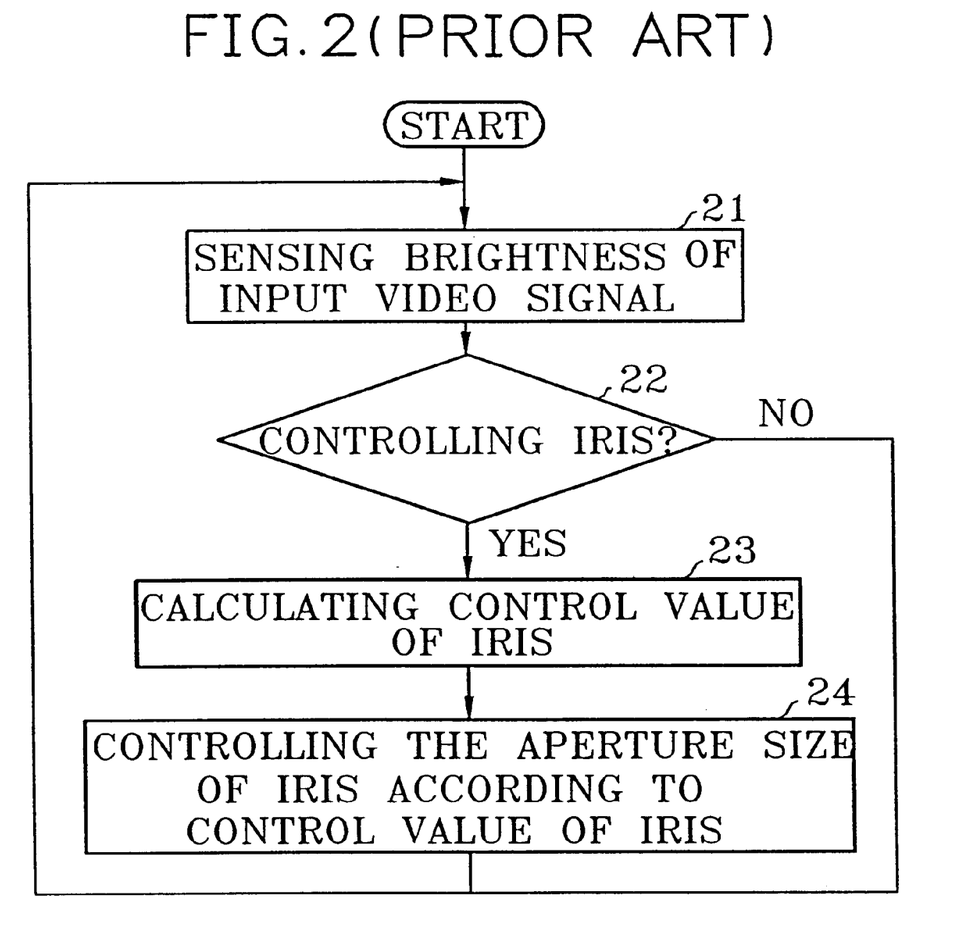
FIG. 2 is a flow chart showing a conventional method for controlling the iris.

FIG. 1 is a block diagram of a conventional apparatus for controlling the iris of a camera; and FIG. 2 is a flow chart showing the operation steps of the conventional apparatus shown in FIG. 1.

As shown in FIGS. 1 and 2, a data detector 12 senses the brightness level of an input video signal input from an iris 11 (step 21). A controller 13 judges whether a change in the size of the aperture of the iris 11 is needed (step 22). If variation of the aperture size of the iris 11 is needed, the controller 13 calculates a control value of the iris 11, and outputs the control value to an iris controller 14 (step 23). The iris controller 14 controls the aperture size of the iris 11 in accordance with the control value from the controller 13 (step 24).

The above method for controlling the iris uses feedback information. The above operations are repeated until an output video signal having a proper brightness level has been achieved.

If the brightness of the input video signal is varied, control of the aperture size of the iris restarts according to the varied brightness. Therefore, time is required to adjust the iris to output a video signal having a proper brightness level. In the meantime, a video signal having improper brightness is generated until the iris has been completely adjusted.

SUMMARY OF THE INVENTION

It is an object of the present invention to provide an apparatus and a method for controlling an aperture size of an iris according to a brightness variation of an input video signal to output a video signal having a proper brightness level.

The method for controlling the iris according to the present invention includes calculating an amplification ratio for generating a video signal having a proper brightness level when variation of the aperture size of the iris is needed, amplifying the input video signal by using the amplification ratio while controlling the aperture size of the iris, and outputting the input video signal having the amplification ratio of 1 when variation in the aperture size of the iris is not needed.

Furthermore, a distorted video signal is generated when the intensity of light abruptly increases. The method for controlling the iris according to the present invention reduces a storage time of the intensity of light by controlling a shutter speed of the camera, thereby preventing distortion of the input video signal.

In order to achieve these objects, an apparatus for controlling the iris includes a data detector, a controller, and an iris controller using a feedback method, and further includes a buffer which stores the amplification ratio to obtain an input video signal having a proper brightness level when control of the iris is needed, and which stores the amplification ratio of 1 when control of the iris is not needed, and a multiplier which amplifies the input video signal by the amplification ratio stored in the buffer.

In addition, the apparatus for controlling the iris prevents the distortion of the video signal by controlling a shutter speed when the intensity of light is abruptly increased.

BRIEF DESCRIPTION OF THE DRAWINGS

The preferred embodiments are described with reference to the drawings wherein.

DETAILED DESCRIPTION OF PREFERRED EMBODIMENTS

A detailed description of the present invention will now be made referring to the accompanying drawings.

Figure 3:
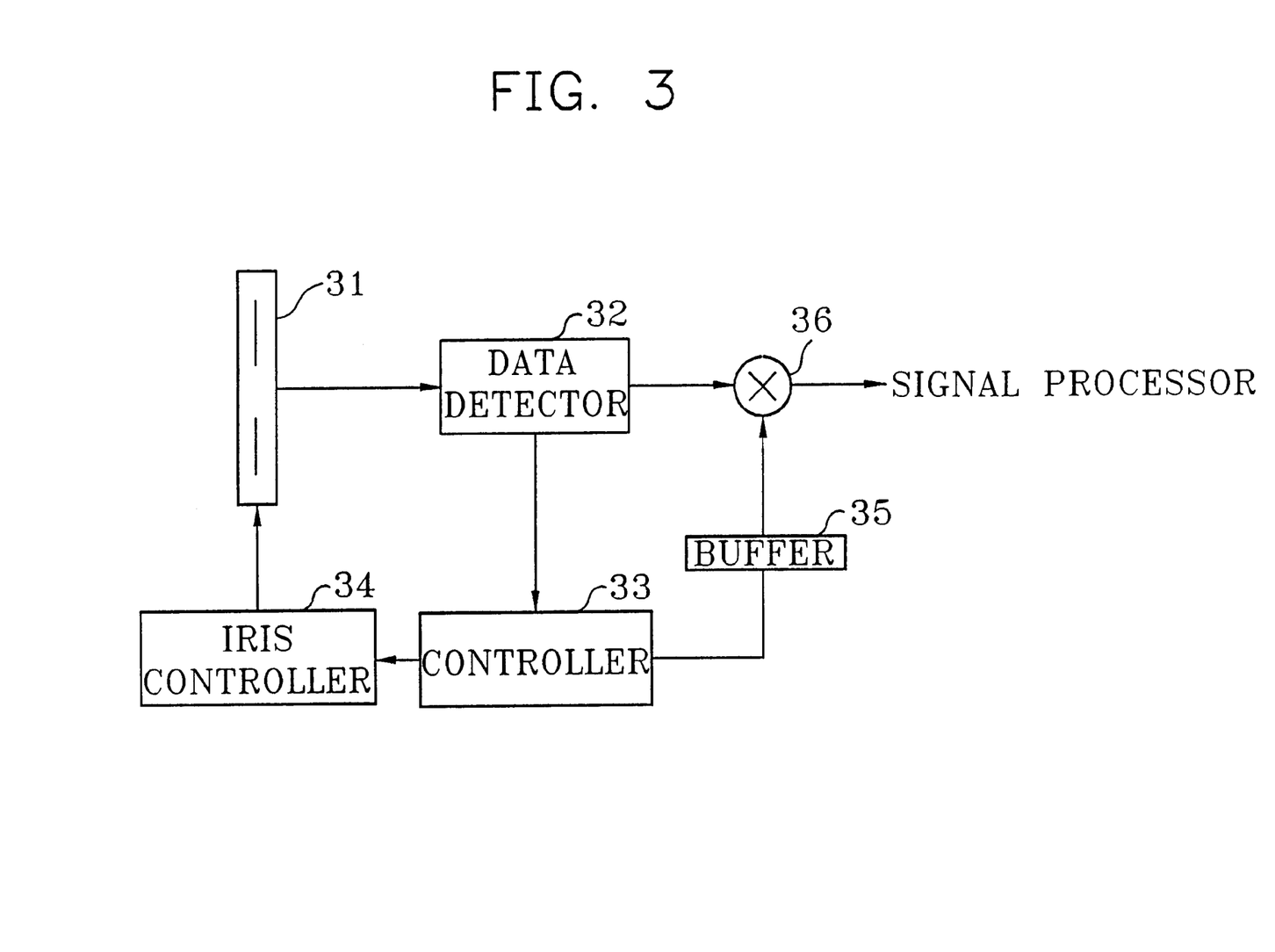
FIG. 3 is a block diagram of an apparatus for controlling the iris in accordance with a preferred embodiment of the present invention.

As shown in FIG. 3, an iris 31, a data detector 32, and an iris controller 34 function in the same manner as the corresponding elements illustrated in FIG. 1. The apparatus shown in FIG. 3 further includes a buffer 35, which stores an amplification ratio for generating an input video signal having a proper brightness level when a variation in the aperture size of the iris is needed, and which stores the amplification ratio of 1 when variation of the aperture size of the iris is not needed, and a multiplier 36 which amplifies the input video signal by the amplification ratio stored in the buffer 35.

In addition, the controller 33 calculates a control value of the iris 31 when control of the iris is needed, and calculates the amplification ratio required to obtain an input video signal with proper brightness, and outputs the amplification ratio to the buffer 35.

The operation of the aforementioned apparatus will be more specifically described with reference to FIG. 4.

Figure 4:
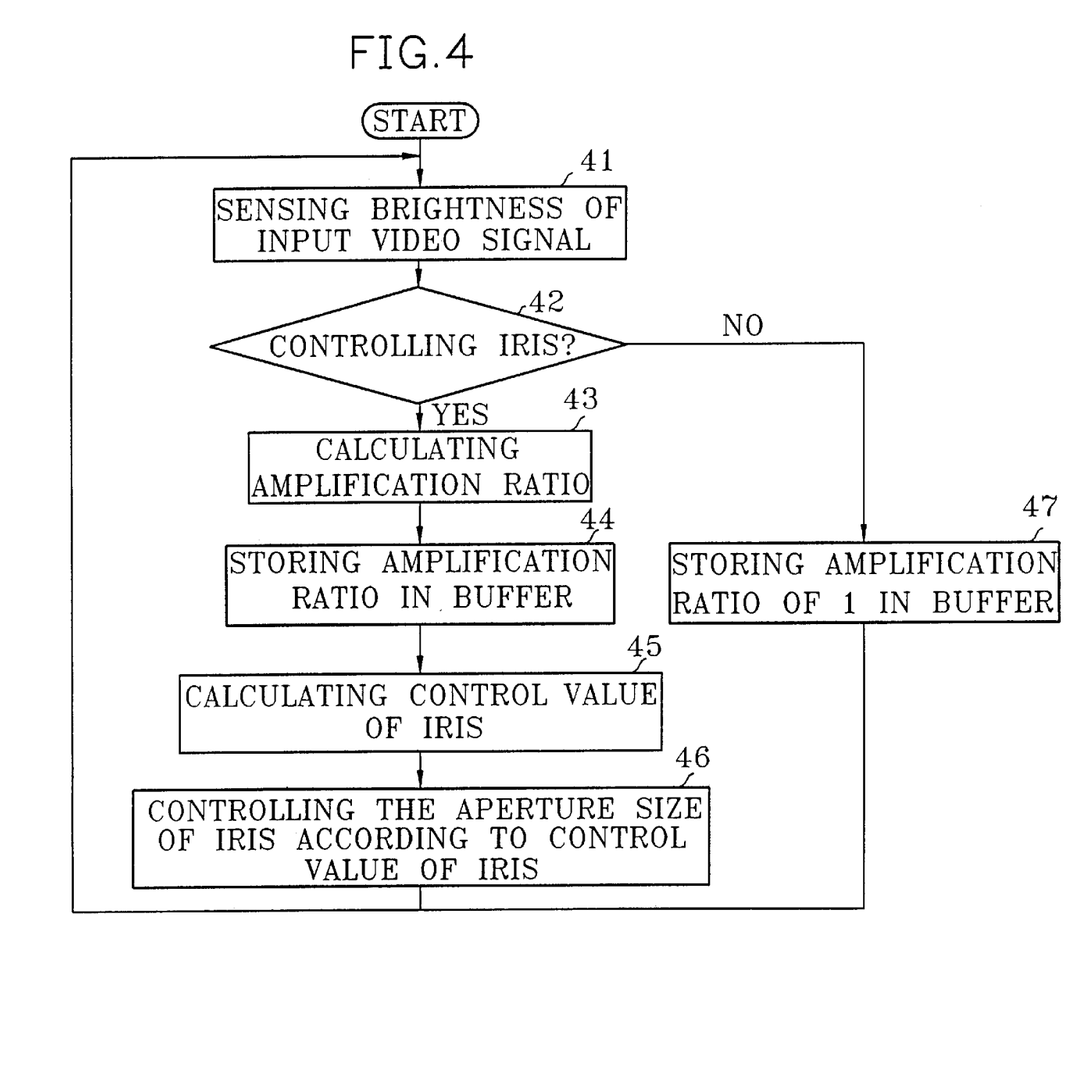
FIG. 4 is a flow chart showing the method for controlling the iris in the apparatus depicted in FIG. 3.

As shown in FIG. 4, the data detector 32 senses a brightness of the input video signal from the iris 31, and outputs the brightness signal to the controller 33 (step 41). The controller 33 judges whether a control of the aperture size of the iris is needed (step 42). The controller 33 calculates the amplification ratio required to obtain a video signal with proper brightness when control of the iris is needed (step 43). The amplification ratio from the controller 33 is stored in the buffer 35 (step 44). The controller 33 calculates the control value of the iris when control of the aperture size of the iris is needed (step 45). The iris controller 34 controls the aperture size of the iris according to the calculated control value (step 46). After controlling the iris, operation returns to step 41, so that the aforementioned steps are repeated.

When the controller 33 judges that there is no need for controlling the iris because the input video signal has an acceptable brightness level (step 42), the amplification ratio of 1 is stored in the buffer 35 (step 47). After storing the amplification ratio to the buffer 35, the operation is fed back to step 41, so that the aforementioned steps are repeated.

The multiplier 36 amplifies the video signal from the data detector 32 by using the amplification ratio stored in the buffer 35. Therefore, the video signal amplified by the amplification ratio is generated while controlling the aperture size of the iris. The input video signal having the amplification ratio of 1 is output when control of the aperture size of the iris is not needed.

According to the aforementioned method, when control of the aperture size of the iris is needed because of an improper brightness level of the input video signal, the video signal is amplified simultaneously with the control of the aperture size of the iris by use of a feedback operation, thereby generating a video signal having proper brightness. When the input video signal has the proper brightness (that is, when the input video signal essentially has a proper brightness or attains a proper brightness through a control of the iris), the input video signal is output without a change.

In the aforementioned apparatus for controlling the iris, when a camera user moves from a dark place having a small quantity of light to a place having a large quantity of light, the aperture of the iris is open wide. Accordingly, since the wide-open iris suddenly receives a large quantity of light, an overflow in the quantity of light may occur in a charge coupled device (hereinafter referred to as a CCD) cell. A description of the overflow condition will be more specifically explained with reference to FIGS. 5A to 6C.

Figures 5A, 5B, 5C:
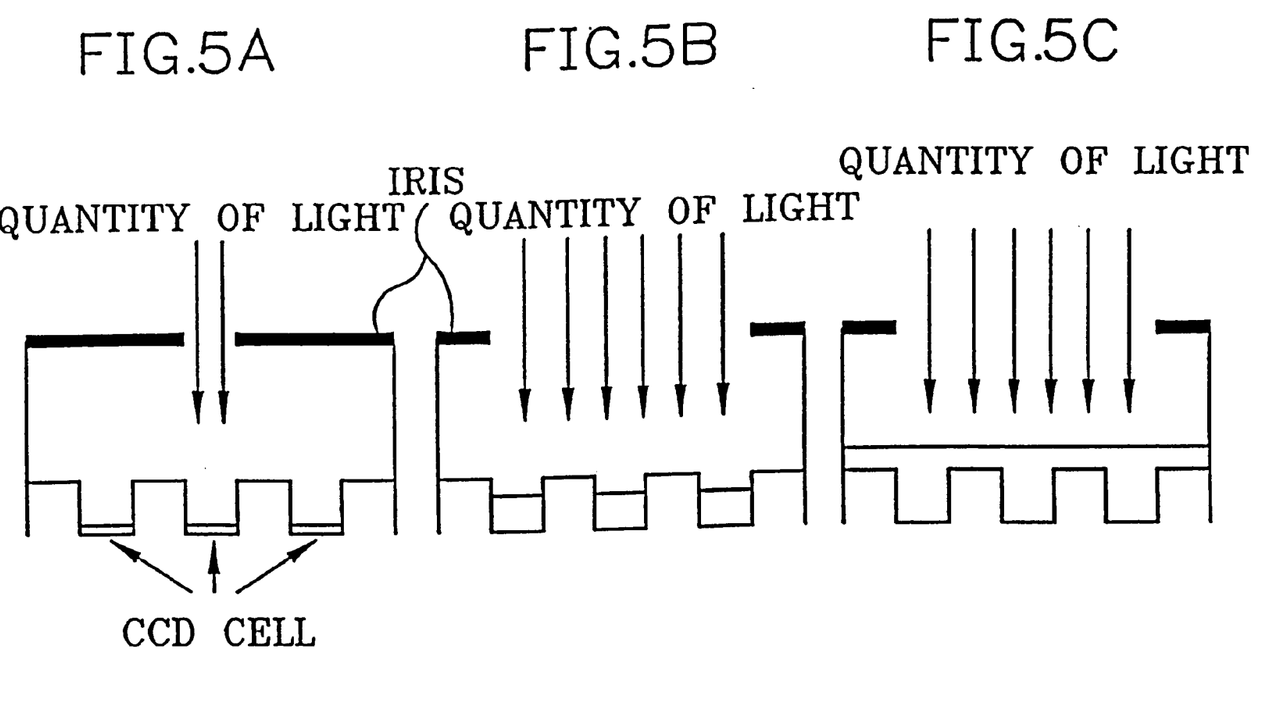
FIGS. 5A to 5C show operating conditions of the iris and a charge coupled device (CCD) cell according to a variation in the intensity of light.

FIG. 5A shows the state of the iris before the aperture size of the iris is controlled when the user moves from a light place to a dark place. The iris is slightly open in the light place having large quantities of light. After moving from the light place to the dark place having the small quantity of light, the iris is still slightly open before control of the iris.

Figure 6A:
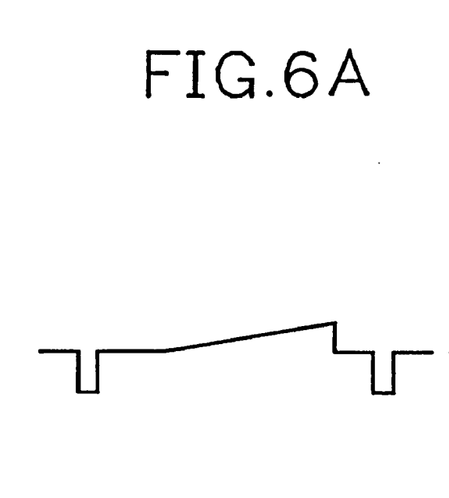
FIGS. 6A to 6C show an input video signal in the operating conditions depicted in FIG. 5.

As a result, as shown in FIG. 6A, the input video signal has a low brightness level. In this case, the overflow of the quantity of light does not occur in the CCD cell.

Figure 6B:
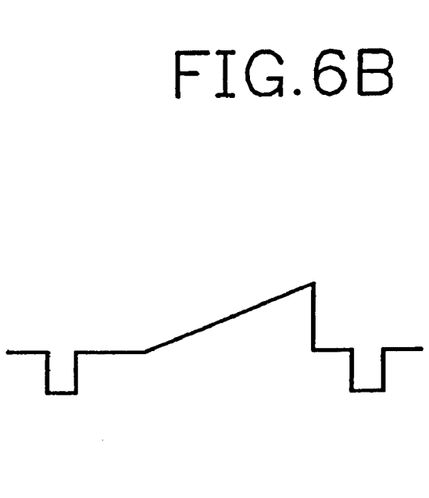

FIG. 5B shows a condition after control of the iris when the user moves from the light place to the dark place. As shown in FIG. 5B, the iris is opened wide by controlling the aperture size of the iris, and attains a larger quantity of light. As a result, the magnitude of the brightness of the input video signal is controlled as shown in FIG. 6B.

Figure 6C:
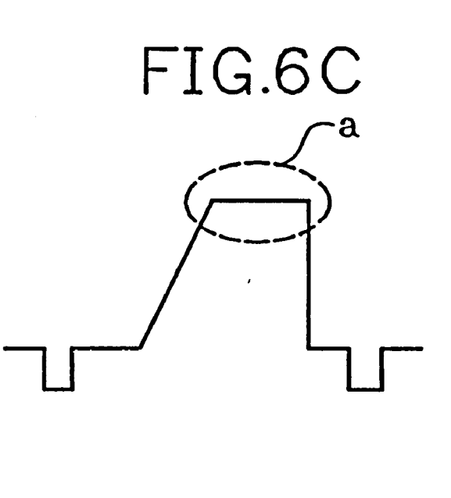

FIG. 5C shows a condition before the control of the iris when the user moves from a dark place to a light place. The iris is open wide in the dark place. After moving from the dark place to the light place, the iris is still open wide during control of the iris. Accordingly, an overflow of the quantity of light occurs at the CCD cell, so that the input video signal is distorted as shown in FIG. 6C.

Another preferred embodiment of the present detects the quantity of light, shortens the storage time of the photoelectric charge stored in the CCD cell by increasing a shutter speed when the sensed quantity of light is larger than a threshold value of the overflow of the CCD cell, and thus prevents the overflow of the CCD cell during control of the iris.

Figure 7:
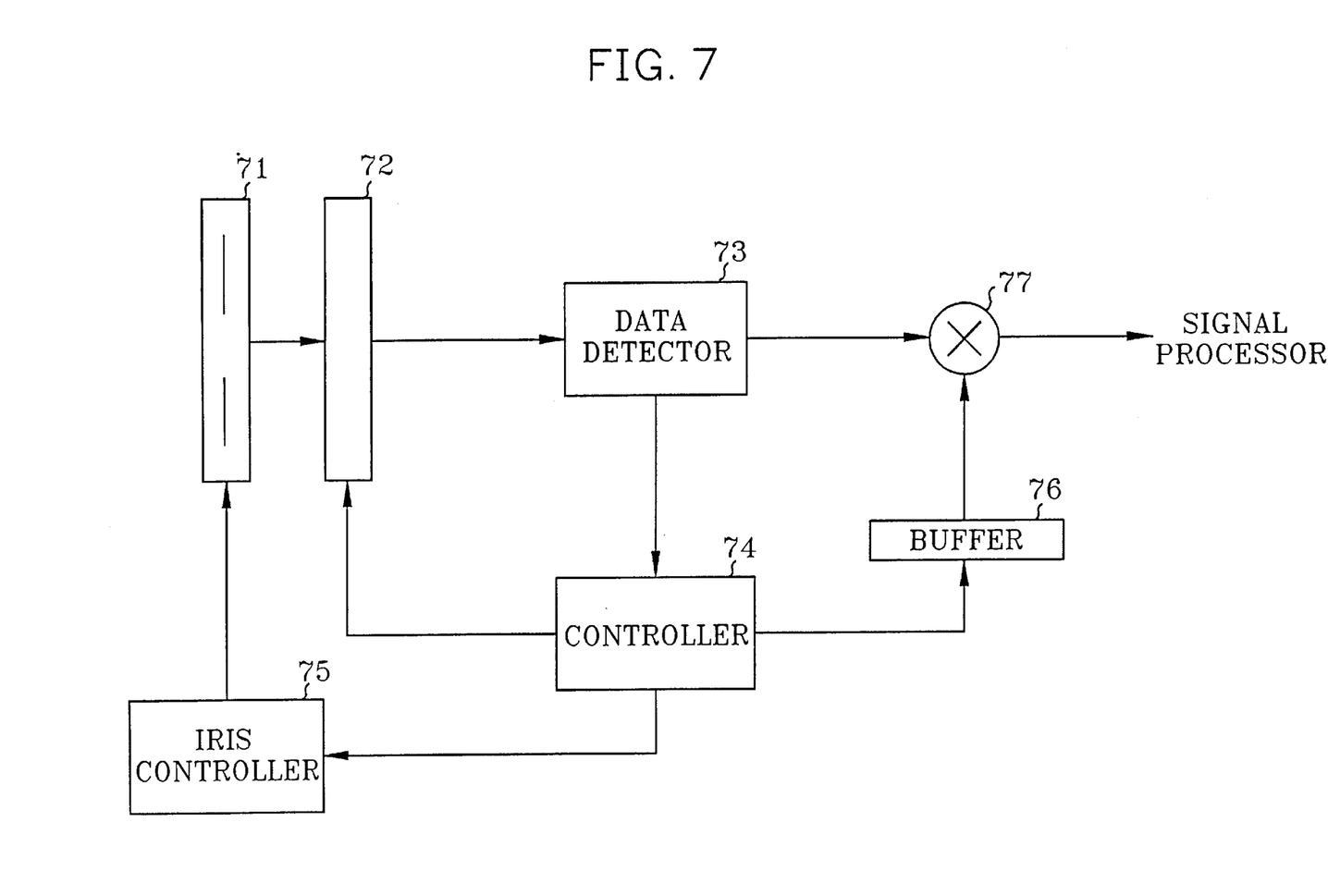
FIG. 7 is a block diagram of an apparatus for controlling the iris in accordance with another preferred embodiment of the present invention.

FIG. 7 is a block diagram of the apparatus for controlling the iris in accordance with another preferred embodiment of the present invention. As shown in FIG. 7, elements of the preferred embodiment of the present invention are identical with those of FIG. 3. However, a controller 74 further includes the step of controlling the speed of a shutter 72.

Figure 8A:
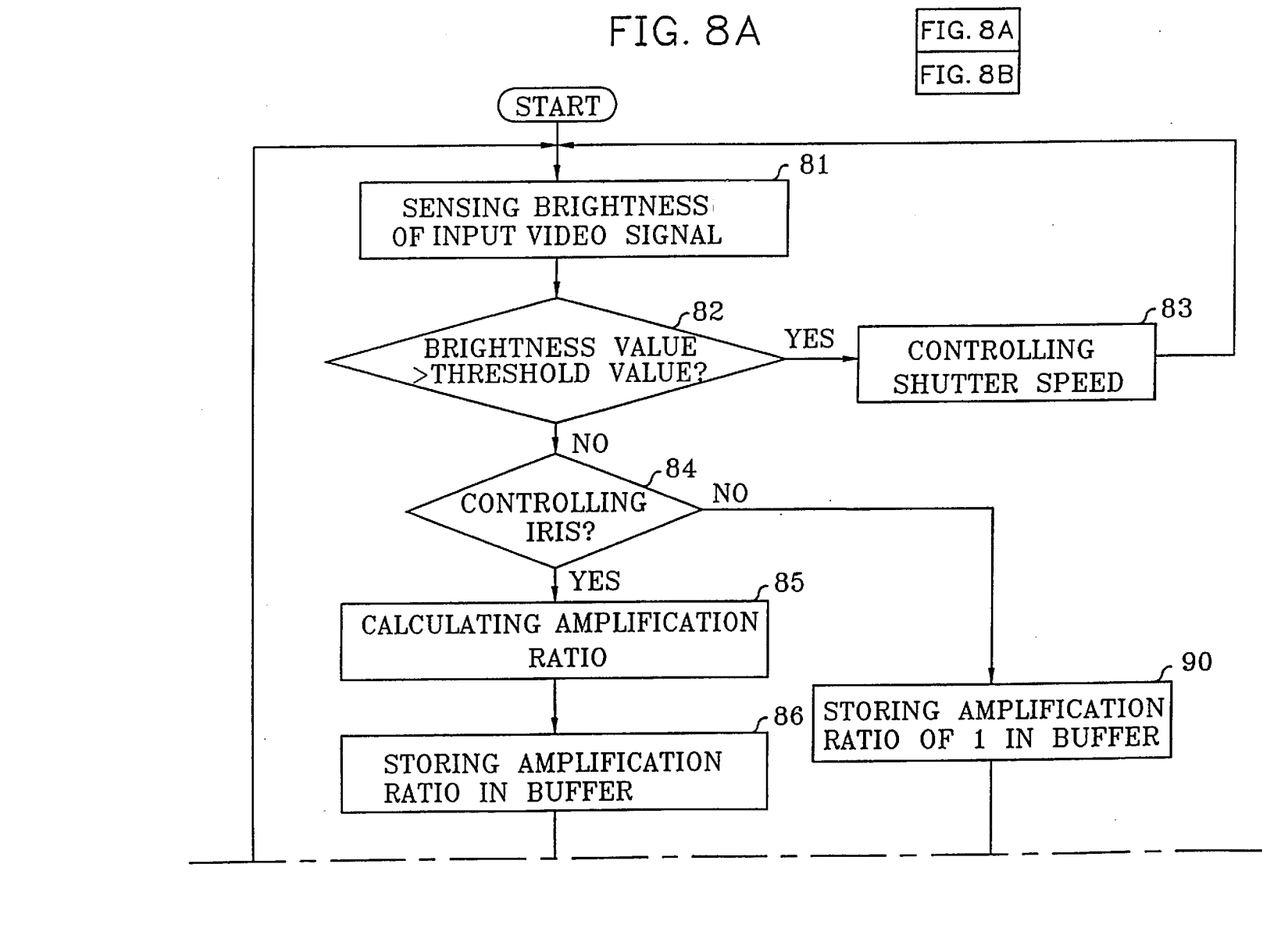
FIGS. 8A and 8B illustrate a flow chart showing the method for controlling the iris in the apparatus depicted in FIG. 7.
Figure 8B:
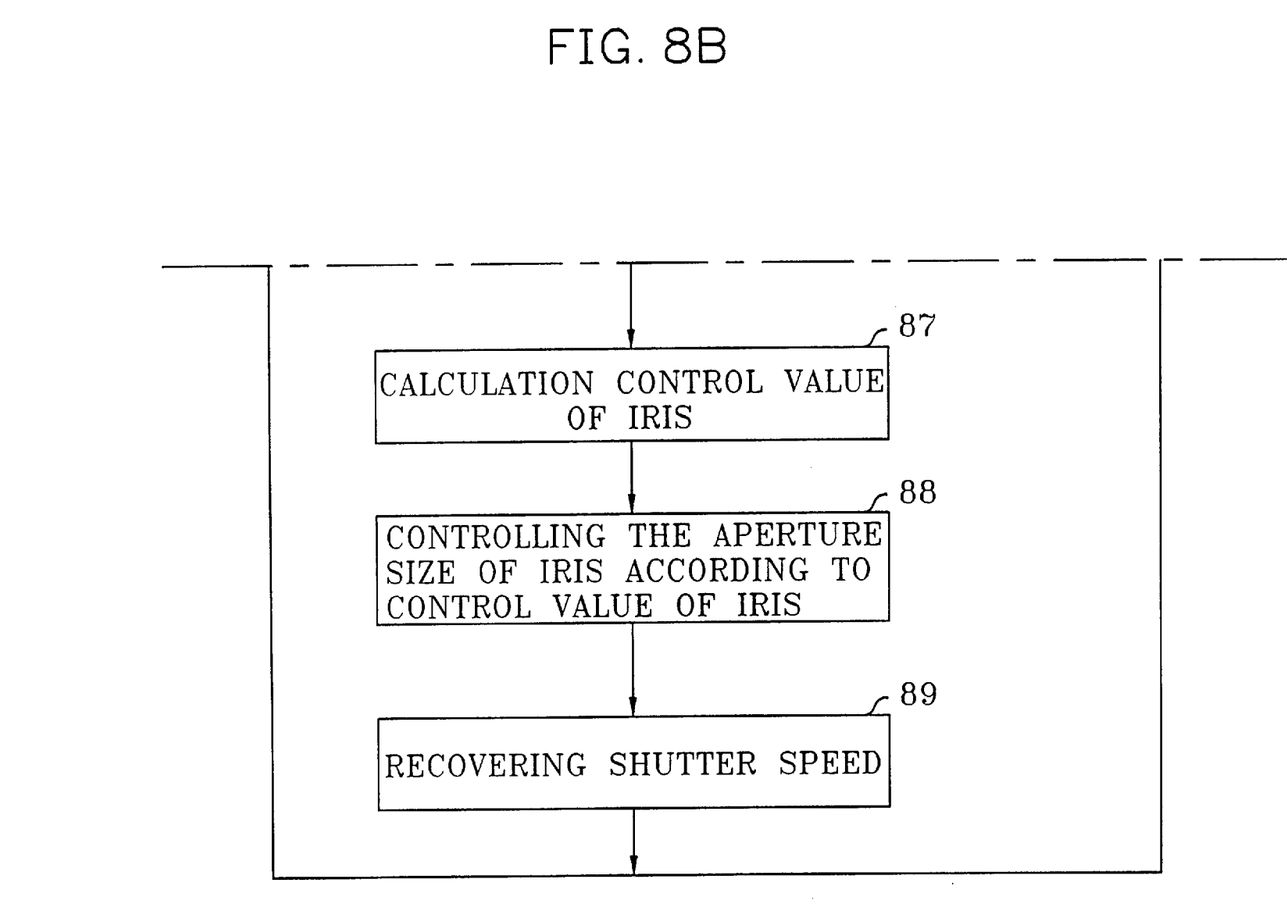

The operation of the apparatus shown in FIG. 7 will be more specifically described with reference to FIGS. 8A and 8B.

A data detector 73 senses a brightness of the input video signal from an iris 71, and outputs the brightness signal of the input video signal to the controller 74 (step 81).

The controller 74 compares the brightness signal with a predetermined threshold value, and determines whether a value of the brightness is higher than the threshold value (step 82). In this case, the threshold value is a maximum value of a brightness signal at which overflow of the CCD cell does not occur. The controller 74 controls the shutter 72 by calculating the shutter speed when the brightness value is higher than the threshold value (step 83). That is, a storage time of the quantity of light stored in the CCD cell is shortened by increasing the shutter speed, so that the overflow of the quantity of light does not occur in the CCD cell.

The controller 74 determines whether the aperture size of the iris must be varied when the brightness value is not beyond the threshold value (step 84), and calculates an amplification ratio for generating a video signal having a proper brightness level when control of the iris is needed (step 85). A buffer 76 stores the amplification ratio (step 86). The controller 74 calculates a control value of the iris (step 87). The iris controller 75 controls the aperture size of the iris according to the control value of the iris (step 88). After the aperture size of the iris is adjusted, a shutter speed is recovered by the controller 74 (step 89). After controlling the iris, the operation is fed back to step 81, so that the aforementioned steps are repeated.

When the controller 74 judges that there is no need for controlling the iris because the input video signal has a proper brightness level, the amplification ratio of 1 is stored in the buffer 76 (step 90). After storing the amplification ratio in the buffer 76, the operation is fed back to step 81, so that the aforementioned steps are repeated.

The multiplier 77 amplifies the input video signal by the amplification ratio stored in the buffer 76. Therefore, the video signal amplified by the amplification ratio is output while controlling the aperture size of the iris. The input video signal having the amplification ratio of 1 is output when there is no need for controlling the iris.

As mentioned above, the method and corresponding apparatus for controlling the iris according to the present invention provide a video signal which has a proper brightness level by controlling the aperture size of the iris by a feedback method by using both the buffer and the multiplier. In addition, the present invention prevents the distortion of the input video signal by controlling the shutter speed when the quantity of light is abruptly changed.

It is understood that various other modifications will be apparent to and can be readily made by those skilled in the art without departing from the scope and spirit of this invention.

Accordingly, it is not intended that the scope of the claims appended hereto be limited to the description as set forth herein, but rather that the claims be construed as encompassing all the features of patentable novelty that reside in the present invention.

While only certain embodiments of the invention have been specifically described herein, it will be apparent that numerous modifications may be made thereto without departing from the spirit and scope of the invention.

What is claimed is:

1. A method for controlling an iris according to variations in brightness level, comprising the steps of:

sensing a brightness level of an input video signal received by said iris;

determining whether modification of an aperture size of said iris is needed in accordance with said brightness level;

calculating and storing an amplification ratio for amplifying said input video signal to obtain a predetermined brightness level when modification of said aperture size of said iris is needed;

storing an amplification ratio of 1 when modification of said aperture size of said iris is not needed;

calculating a control value of said iris when modification of said aperture size of said iris is needed;

controlling said aperture size of said iris in accordance with said control value; and amplifying said input video signal by said amplification ratio.

2. The method according to claim 1, wherein said step of calculating said control value includes the step of multiplying said input video signal by said amplification ratio.

3. The method according to the claim 1, further comprising the steps of:

detecting an increase in a quantity of light by comparing said brightness level of said input video signal with a predetermined threshold value; and increasing a shutter speed when said brightness level is larger than said predetermined threshold value.

4. The method according to claim 3, further comprising the step of:

recovering said shutter speed to an original shutter speed after controlling said aperture size of said iris.

5. An apparatus for controlling an iris according to variations in brightness level, comprising:

an iris;

a data detector for sensing a brightness level of an input video signal received by said iris;

a controller for determining whether variation in an aperture size of said iris is needed, for calculating an amplification ratio for amplifying said input video signal to obtain a predetermined brightness level when modification of said aperture size of said iris is needed, and for calculating a control value of said iris;

a buffer for storing said amplification ratio;

an iris controller for modifying said aperture size of said iris in accordance with said control value; and a multiplier for multiplying said brightness level of said input video signal by said amplification ratio stored in said buffer;

wherein said controller outputs an amplification ratio of 1 to said buffer when modification of said aperture size of said iris is not needed.

6. The apparatus according to claim 5, further comprising a shutter, wherein said controller determines a condition of an abrupt increase in the quantity of light when said brightness level of said input signal is higher than a predetermined threshold value, and controls a shutter speed.

7. The apparatus according to claim 5, further comprising a shutter, wherein said controller determines a condition of an abrupt increase in the quantity of light when said brightness level of said input signal is higher than a predetermined threshold value, and controls a shutter speed.

8. The apparatus according to claim 5, wherein said controller is arranged to recover said shutter speed to an original shutter speed after modifying said aperture size of said iris.

9. The apparatus according to claim 7, wherein said controller is arranged to recover said shutter speed to an original shutter speed after modifying said aperture size of said iris.

* * * * *